United States Patent
Yamasaki et al.

(10) Patent No.: US 9,207,092 B1
(45) Date of Patent: Dec. 8, 2015

(54) DISPLAYING NAVIGATION INFORMATION WITHIN A SECONDARY USER INTERFACE OF A MOBILE DEVICE

(71) Applicant: Google Inc., Mountain View, CA (US)

(72) Inventors: Erika Yamasaki, Tokyo (JP);
Byambajav Namsraijav, Tokyo (JP);
Yongzhong Lee, Kanagawa (JP); David Robert Gordon, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/579,185

(22) Filed: Dec. 22, 2014

(51) Int. Cl.
| | |
|---|---|
| *G01C 21/34* | (2006.01) |
| *G01C 21/00* | (2006.01) |
| *G01C 21/36* | (2006.01) |
| *G06F 21/62* | (2013.01) |

(52) U.S. Cl.
CPC ............ *G01C 21/36* (2013.01); *G01C 21/3617* (2013.01); *G01C 21/3632* (2013.01); *G01C 21/3673* (2013.01); *G06F 21/629* (2013.01); *H04M 2201/38* (2013.01)

(58) Field of Classification Search
CPC ........... G01C 21/3632; G01C 21/3617; G01C 21/3667; G01C 21/3673; G06F 21/629; H04M 2201/38
See application file for complete search history.

(56) References Cited

U.S. PATENT DOCUMENTS

| | | | |
|---|---|---|---|
| 6,748,317 B2 * | 6/2004 | Maruyama et al. ........... | 701/433 |
| 6,751,551 B2 * | 6/2004 | Katayama et al. ............ | 701/538 |
| 7,130,743 B2 * | 10/2006 | Kudo et al. .................... | 701/424 |
| 7,260,473 B2 * | 8/2007 | Abe et al. ....................... | 701/420 |
| 8,498,817 B1 * | 7/2013 | Erdmann et al. .............. | 701/519 |
| 2012/0084734 A1 * | 4/2012 | Wilairat ........................ | 715/863 |
| 2012/0115438 A1 | 5/2012 | Umealu | |
| 2012/0223890 A1 * | 9/2012 | Borovsky et al. ............. | 345/173 |
| 2012/0284297 A1 | 11/2012 | Aguera-Arcas et al. | |
| 2013/0325481 A1 * | 12/2013 | van Os et al. ................. | 704/275 |
| 2013/0345975 A1 * | 12/2013 | Vulcano et al. ............... | 701/533 |
| 2013/0345981 A1 * | 12/2013 | van Os et al. ................. | 701/540 |

OTHER PUBLICATIONS

Kendrick, "The Google Now Killer Feature Almost No Android Device Can Use", posted Apr. 29, 2013, www.zdnet.com/the-google-now-killer-feature-almost-no-android-device-can-use-7000014667, retrieved Oct. 29, 2014, 9 pages.

(Continued)

*Primary Examiner* — Michael J Zanelli
(74) *Attorney, Agent, or Firm* — Dority & Manning, P.A.

(57) ABSTRACT

Computer-implemented methods and systems of displaying navigation information on a mobile device include determining navigation directions to a destination location and providing related navigation information for display on a primary user interface while the mobile device is operated in an active operating mode. Upon detecting a transition of the mobile device from the active operating mode to a passive operating mode, a subset of location information is configured for display on a secondary user interface. The passive location information can include one or more of a semantic place label associated with the mobile device's current location and a directions indicator in which a user of the mobile device should travel along the navigation directions in order to reach the destination location from the mobile device's current location and/or device orientation. The navigation information can be updated continuously, periodically and/or upon reaching turn points within the navigation directions.

20 Claims, 9 Drawing Sheets

(56) References Cited

OTHER PUBLICATIONS

Marinacci, "Redesigning the Lock Screen", posted Aug. 4, 2013, www.joshondesign.com/2013/08/04/lockscreen, retrieved Oct. 29, 2014, 8 pages.

Ritchie, "How to Use Lock Screen Today, Popups, and Banners in Notification Center for iPhone and iPad", posted Apr. 30, 2014, www.imore.com/how-use-notification-center-iphone-ipad, retrieved Nov. 11, 2014, 10 pages.

Walter, "Customize Your Android Lock Screen with DashClock", posted May 19, 2014, www.greenbot.com/article/2156403/custornize-your-lock-screen-with-dashclock.html, retrieved Nov. 11, 2014, 4 pages.

\* cited by examiner

DISPLAYING NAVIGATION INFORMATION WITHIN A SECONDARY USER INTERFACE OF A MOBILE DEVICE

FIELD

The present disclosure relates generally to displaying navigation information on a mobile device, and more particularly to displaying a directions indicator within a secondary graphical user interface on a mobile device.

BACKGROUND

Mobile devices including smart technology features and mapping applications can be employed when authorized to determine the location of mobile device users as they navigate to various destination locations. Given the desire to respect user privacy, mobile device location is typically only determined if a user provides consent therefor. Any authorized sharing of user location data is secure and private, and shared only if additional consent is provided. For many purposes, user identity associated with the location of a mobile device is configured in an anonymous manner such that user assistance and information related to a specific location is provided without a need for user-specific information.

Existing navigation technology can be used by mobile device users to provide valuable navigation information to a user during the course of travel to a destination location. During travel, this navigation information can be accessed by a mobile device user, for instance, in one of two options. A first option can keep the mobile device operating in a primary active operating mode to provide a user with constant access to the map and the next set of directions from a mapping application. This first option has the potential to consume a significant amount of the mobile device's battery power. A second option can correspond to a user unlocking his mobile device each time the user wants to check his location on the map. This second option can be time consuming, and even more so if the user has a passcode set on the device.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of displaying navigation information on a mobile device. The method can include determining, by one or more processors, navigation directions to a destination location. The method can further include detecting, by the one or more processors, a transition of the mobile device from an active operating mode to a passive operating mode. The method can further include configuring, by the one or more processors, the mobile device to display a secondary user interface on the mobile device upon detection of the transition of the mobile device from the active operating mode to the passive operating mode. The method can further include providing for display, by the one or more processors, navigation information associated with the navigation directions on the secondary user interface. The navigation information can include a directions indicator that dynamically displays a direction in which a user of the mobile device should travel along the navigation directions in order to reach the destination location.

Other example aspects of the present disclosure are directed to systems, apparatus, tangible, non-transitory computer-readable media, user interfaces, memory devices, and electronic devices for displaying navigation information and other related data on a mobile device.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
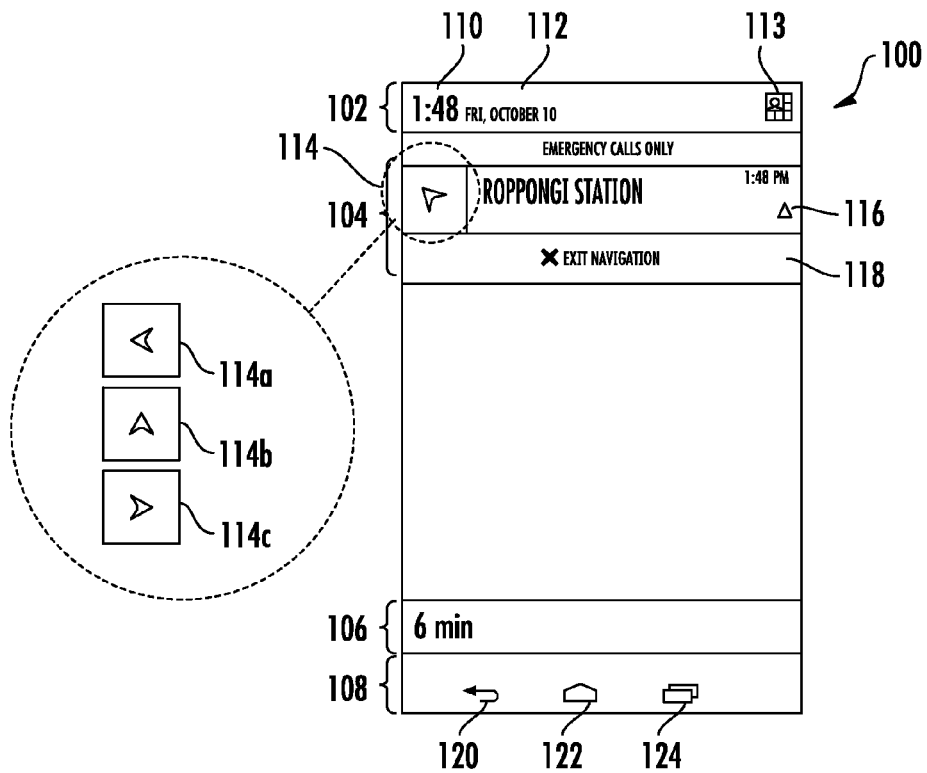
FIG. 1 depicts a first example secondary graphical user interface configured to display selected navigation information on a mobile device according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for generating and displaying navigation information on a mobile device. Existing technology affords a user the option to either use a map navigation feature which will keep the mobile device screen awake or to unlock their mobile device each time the user wants to check his/her location on the map. The former option often makes sense for drivers and users who are in a completely unfamiliar area and need constant access to the map and the next set of directions from a map application. The latter option is a good compromise for users who are familiar with an area and do not need to be looking constantly at the map. Instead, the user can get directions as they are needed by waking their mobile device and foregrounding the map application. However, this option is still time consuming and may be even more time consuming if the user has a passcode set on his/her device. When a user simply wants to confirm that he/she is walking in the correct direction or needs to verify when he/she needs to take the next turn, this method can be slow and cumbersome. As such, a need remains for a user interface that provides users with quick access to a next set of directions while they are trying to go somewhere and helps them understand which direction they should be walking in at any given moment.

The disclosed embodiments according to aspects of the present disclosure can generate and display navigation information, such as a directions indicator, within a user interface such as a lock screen or a notifications interface for a mobile device. The navigation information can be configured as part of a secondary user interface displayed to a user while the mobile device is in a passive as opposed to an active operating mode. One benefit of providing a subset of navigation information in the passive operating mode is that the user is able to obtain quick access to key navigation information while operating the mobile device.

Another advantage of providing such navigation information is realized when the information includes a directions indicator that dynamically updates the direction a user needs to travel relative to the current location of the user, the current orientation of the user's mobile device and/or the user's current direction of travel, thus providing the user with real time and/or periodic updates of navigation assistance. Such information can be particularly advantageous for mobile device users operating their mobile devices to navigate as they walk to a destination location. By providing the selected subset of navigation information on a secondary user interface while in a passive operating mode, additional power saving benefits are realized for the mobile device. In addition, the step of entering a credential, passcode or other interactive user gesture in order to obtain selected navigational information can be avoided in certain embodiments, thus providing time saving benefits.

In some embodiments, in order to obtain the benefits of the techniques described herein, the user may be required to allow the collection and analysis of location information associated with the user or his/her device. For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed.

Example embodiments can include computer-implemented systems and methods of displaying navigation information on a mobile device. Navigation directions to a destination location are initially determined using a mapping application or other navigation functionality operating on the mobile device. In some examples, the navigation directions are determined or accessed in response to a request for navigation directions to the destination location (e.g., a user request provided as input to the mapping application). In other examples, the navigation directions are determined automatically upon identifying that the mobile device is traveling towards a predicted destination location. Such automated destination detection capabilities can serve to predict where a user is going without the user explicitly telling the mobile device. Automated destination detection can be implemented from a variety of signals available at the mobile device, for example, comparing current location and/or current route to one or more variables such as user location history, user preferences, user search history, historical route and destination data and the like.

Navigation information associated with the determined navigation directions optionally can be displayed on a primary user interface accessible on the mobile device while the mobile device is operating in an active operating mode. The navigation information can include one or more components of navigation data including but not limited to start location, destination location, one or more suggested route options between the start and destination locations, a current location indicator along the one or more routes, estimated distance and/or time remaining on a route, a directions indicator pointing a user in the proper direction for traveling towards the destination location, a detailed list of directional steps for the user to follow while traveling to the destination location, a location entity (e.g., a semantic place label) associated with the user's current location, start location and/or destination location, and geographical maps that display aspects of the aforementioned components.

Mobile device mapping applications generally are able to provide a user with a wealth of the above navigation information while the mobile device is actively using the mapping application, browser, or other navigation feature that generates such navigation information. A primary user interface that displays this comprehensive collection of navigation information is available while the mobile device is operating in a first operating mode (e.g., an active mode). When the mobile device transitions to a second operating mode (e.g., a passive mode that uses less power than the active mode), it still may be desirable to display a subset of the navigation information to a user. As such, aspects of the disclosed technology will be provided to detect when a mobile device transitions from the first (active) operating mode to the second (passive) operating mode. In some embodiments, a mobile device transitions from the active operating mode to the passive operating mode after little to no user interaction has been detected at the mobile device for a predetermined amount of time.

Upon transition from the active operating mode to the passive operating mode, the mobile device can be configured to display a secondary user interface. The secondary user interface may include, for example, a lock screen for the mobile device and/or a passive notifications screen for the mobile device. A subset of the navigation information associated with the navigation directions can be displayed on the secondary user interface. In some examples, the subset of navigation information displayed on the secondary user interface includes a directions indicator that dynamically displays a direction in which a user of the mobile device should travel along the navigation directions in order to reach the destination location from a current location and device orientation. In some examples, the directions indicator includes a graphical icon such as an arrow, a line with or without an end element, a pointer and/or a tapered polygon. In some examples, the navigation information including the directions indicator is updated periodically and/or when a user reaches predetermined turn points along the navigation directions. In some examples, the navigation information displayed on the secondary user interface includes a next upcoming direction step within the navigation directions to the destination location. In some examples, an arrival notification is provided on the secondary user interface upon determining that the mobile device has reached the destination location.

According to an example embodiment, a mobile device user receives navigation directions to a destination location using a mapping application provided on his mobile device. The mobile device initially can display a comprehensive collection of navigation information including a route map from the current and/or start location to the destination location, next steps to take for traveling toward the destination location and directional indicators for pointing a user in the correct direction towards the destination location. After a certain amount of time has lapsed, the mobile device transitions from an active operating mode to a passive operating mode (e.g., the mobile device enters a "sleep mode" after a predetermined amount of time has lapsed without user interaction). In sleep mode, the device may enter a locked state, in which a limited set of information may be displayed, but user interaction with the device is generally limited to entering a credential or passcode to unlock the device. However, many services of the mobile device remain active even in the passive operating mode, such as location determination and certain notifications. Even after transition to the passive operating mode, a user of the mobile device still desires quick access to a meaningful subset of the navigation information. As such, a portion of the navigation information is extracted and displayed on a secondary user interface, such as the lock screen or notifications center screen of the mobile device. In this example, a mobile device user is provided meaningful navigation information without having to reinstate the active operating mode of the mobile device and while saving batter power during navigation to the destination location. This battery power savings can be achieved, for example, by limiting certain running services and dimming or turning off portions of the mobile device display.

Figure 7:
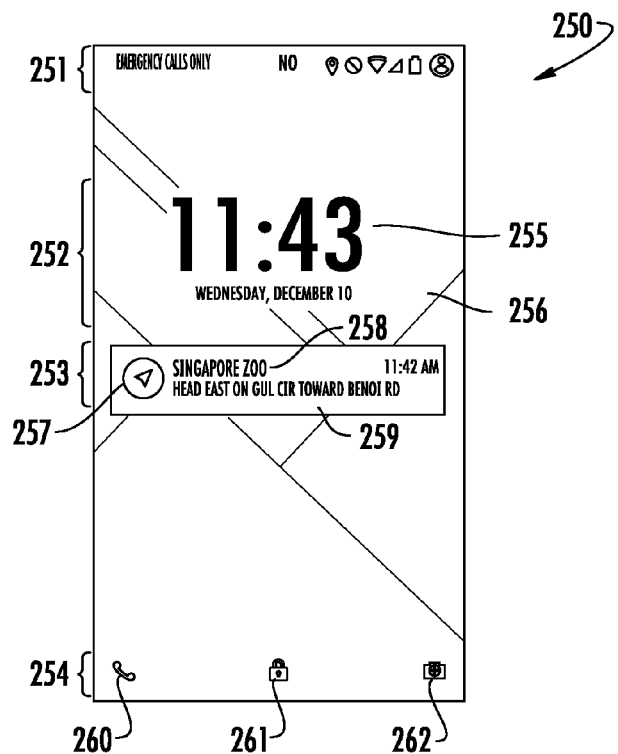
FIG. 7 depicts a seventh example secondary graphical user interface configured to display selected navigation information on a mobile device according to example aspects of the present disclosure.
Figure 8:
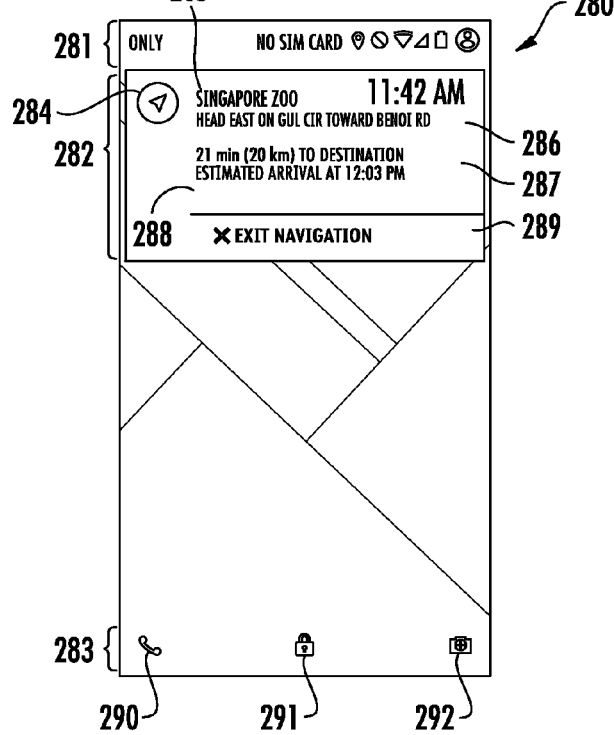
FIG. 8 depicts an eighth example secondary graphical user interface configured to display selected navigation information on a mobile device according to example aspects of the present disclosure.
Figure 9:
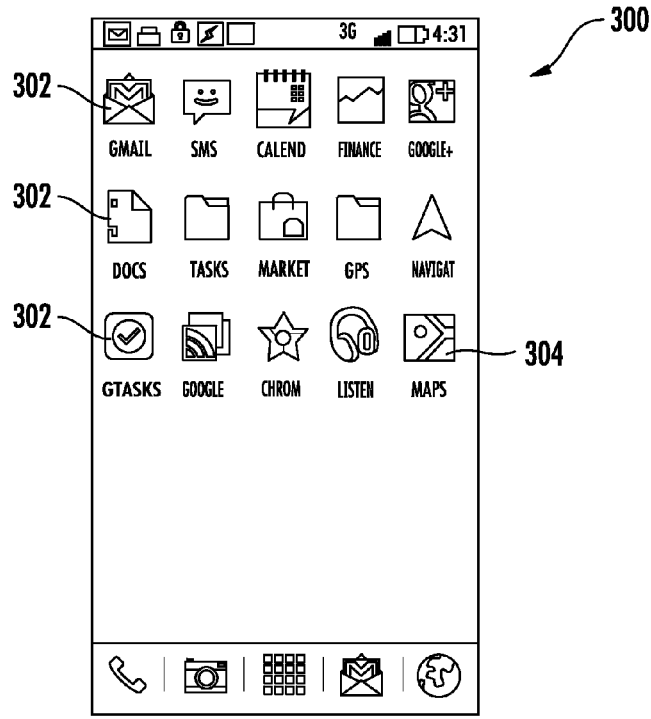
FIG. 9 provides a first example primary graphical user interface configured to display application information on a mobile device according to example aspects of the present disclosure.
Figure 10:
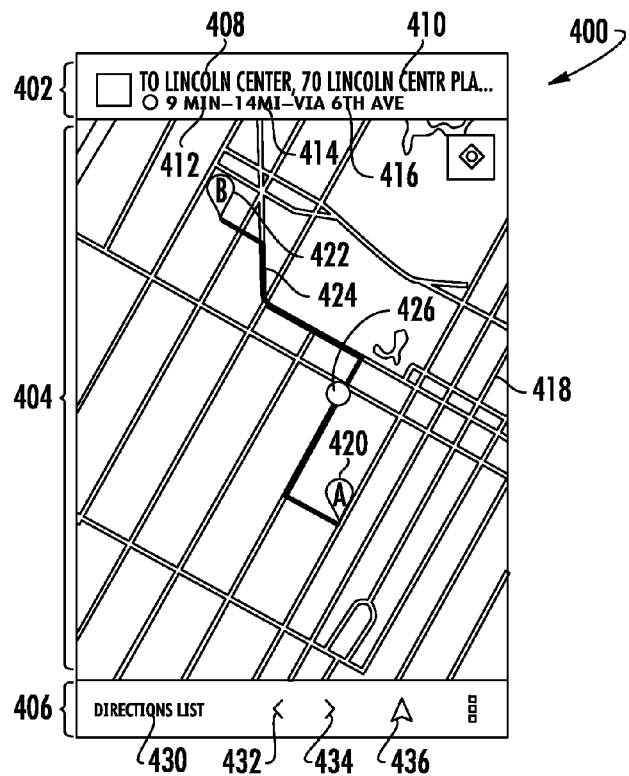
FIG. 10 provides a second example primary graphical user interface configured to display navigation information on a mobile device according to example aspects of the present disclosure.

FIGS. 1-10 display aspects of various graphical user interfaces that can be generated and provided for display on a screen or other output component of a mobile device in accordance with aspects of the disclosed technology. FIGS. 1-8 depict example secondary user interfaces that can be used to display select navigational information while a mobile device is operating in a passive operating mode, while FIGS. 9-10 depict more comprehensive user interfaces that can be used to display detailed navigation information while a mobile device is operating in an active operating mode.

User interfaces displayed while a mobile device is in an active operating mode are referred to herein as primary user interfaces, and user interfaces displayed while a mobile device is in a passive operating mode are referred to herein as secondary user interfaces. An active operating mode corresponds to one during which a user is actively interfacing with the mobile device by providing at least some input to the mobile device (e.g., pressing or otherwise engaging buttons, a touchscreen, keyboards or other input devices associated with the mobile device). A passive operating mode corresponds to one during which no user interaction (such as the active interfacing described above) has been detected at the mobile device for a predetermined amount of time. A mobile device can readily transition between operating modes. In some examples, transitions from an active operating mode to a passive one occur automatically after a predetermined lapse of time without user interaction. In some examples, transitions from a passive operating mode to an active one require a mobile device user to perform an interactive action such as pressing certain input buttons, unlocking a phone, entering a password or the like. A mobile device is intended to encompass any computing device capable of being carried by a user while in operation. Examples of mobile devices include but are not limited to a personal communication device, a smartphone, navigation system, laptop, tablet, wearable computing device or the like.

The secondary graphical user interfaces of FIGS. 1-8 can be considered lock screens and/or a passive notifications screens for the mobile device on which they are provided for display. A lock screen is understood herein to correspond with any user interface for a mobile device with which a user can interact to transition his mobile device from a passive to active operating mode. In some examples of a lock screen, a user may be prompted to enter a passcode or other security credential before the transition from passive to active mode will occur. In other examples, a user may be prompted to interact with the mobile device touchscreen by sliding a bar over, pressing a home button, or implementing some other gesture or input that triggers the transition from a passive operating mode to an active one. A lock screen can be provided for display after a mobile device has transitioned from an active operating mode to a passive operating mode (e.g., after the mobile device goes to sleep following a predetermined time lapse devoid of user interaction). A passive notifications screen is also a secondary user interface provided after transition from an active operating mode to a passive operating mode to which a select group of notifications can be pushed from applications running on the background in the mobile device. Aspects of the disclosed technology are concerned primarily with being able to push select navigation information to a secondary user interface such as a lock screen and/or a notifications screen.

Referring now to FIG. 1, a first example of a secondary graphical user interface 100 configured to display selected navigation information on a mobile device includes interface portions 102-108, respectively. First interface portion 102 provides a mobile device user with basic information, such as time 110, date 112 and a user profile graphic 113. Second interface portion 104 and third interface portion 106 include select navigation information related to navigation directions accessed or determined by the mobile device.

Second interface portion 104 includes a directions indicator 114 that dynamically displays a direction in which a user of the mobile device should travel in order to reach a destination location from the user's current location and device orientation. Directions indicator 114 is illustrated in FIG. 1 as a graphical arrow icon, although it should be appreciated that the icon could be provided in a different form or style (e.g., a line with or without an end element, a pointer, a tapered polygon, etc.) The directions indicator 114 can be updated periodically to point the user along the next step or direction of travel in a given set of navigation directions towards the destination location. As a user changes direction while traveling to the destination location, the directions indicator 114 also changes directions, thus keeping the user continuously pointing towards his destination location along a given set of navigation directions.

An example of the changing nature of directions indicator 114 can be appreciated from the expanded circle in FIG. 1, which shows how the indicator would dynamically shift in different directions. Different variations 114a-c of directions indicator 114 are intended to represent different snapshots in time of directions indicator 114. More particularly, a first variation 114a of directions indicator 114 would be displayed when the mobile device user needs to travel West along a route towards a destination location. A second variation 114b of directions indicator 114 would be displayed when a user needs to travel North along a route towards a destination location, and third variation 114c indicates that a user needs to travel East along a route towards a destination location. It should be appreciated that the orientation of directions indicator 114 need not be specifically limited to exact compass point directions (e.g., the selected cardinal points used in the illustration of FIG. 1), but can indicate any appropriate direction of travel within a 360-degree range of orientations for the user's mobile device. The dynamically changing nature of directions indicator 114 is an advantage to the mobile device user as he/she seeks to navigate an area (e.g. on foot) towards a destination location. Desired direction of travel as represented by directions indicator 114 can be continuously updated in real time by the mobile device or can be updated periodically at discrete intervals (e.g., once per second or fraction of a second, minute or other portion of time) or when triggered by the occurrence of certain events.

Second interface portion 104 also includes a text field 116 for displaying the name of the destination location and a selectable interface button 118 for terminating the current navigation directions determined by a mapping application on the mobile device. Third interface portion 106 includes a text field for displaying an estimated time left for the user to reach the destination location. Although second interface portion 104 and third interface portion 106 are provided in different locations relative to one another within secondary graphical user interface 100, it should be appreciated that such interface portions could be integrated together in other examples or be provided in different locations.

The interface portions 104/106 that include navigation information could also include more information than that shown in the example of FIG. 1. For instance, navigation information could include but is not limited to start location, destination location, one or more suggested route options between the start and destination locations, a current location indicator along the one or more routes, estimated distance and/or time remaining on a route, one or more next directional steps for the user to follow while traveling to the destination location, and/or a location entity (e.g., a semantic place label) associated with the user's current location, start location and/or destination location.

Referring still to FIG. 1, fourth interface portion 108 within the secondary graphical user interface 100 can include a plurality of standard user-selectable interface elements that are known as common interface elements on a mobile device. For example, standard interface element 120 corresponds to a back button that when selected takes a user back a level in an application or back a page in a browser or the like. Standard interface element 122 corresponds to a home button that when selected returns the mobile device to its home interface screen. Standard interface element 124 corresponds to a menu button that when selected causes an interface to display additional options within an application or from the home screen. Different forms of button selection (e.g., holding down one of the standard interface elements 120-124 or pressing a button two or more times) can result in still different events within the mobile device operating system and corresponding graphical user interfaces. Still further standard interface elements may be provided within any of the disclosed graphical user interfaces.

Figure 2:
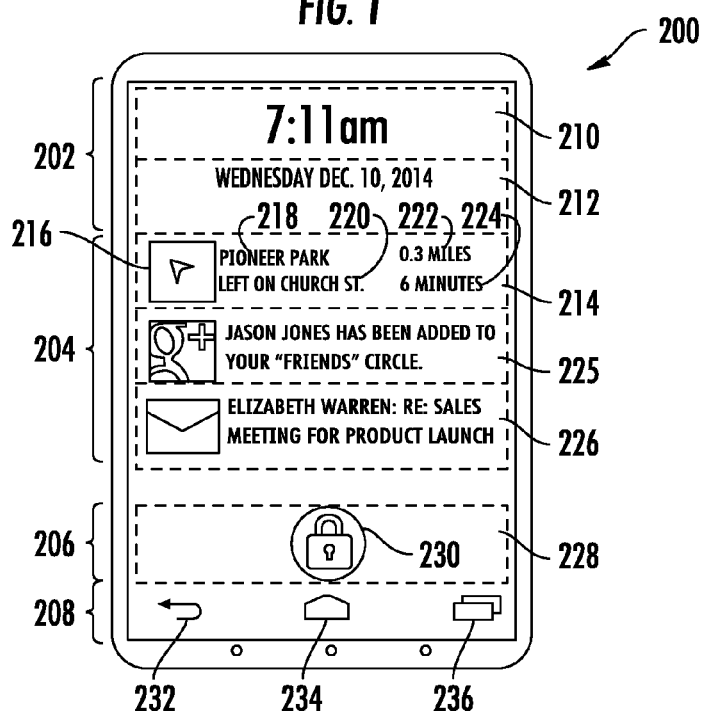
FIG. 2 provides a second example secondary graphical user interface configured to display selected navigation information on a mobile device according to example aspects of the present disclosure.

FIG. 2 depicts a second example of a secondary graphical user interface 200 configured to display selected navigation information on a mobile device. Secondary graphical user interface 200 generally includes a first interface portion 202 including general information for the mobile device, a second interface portion 204 including recent notifications for the mobile device and a third interface portion 206 providing selectable features for unlocking the mobile device, thus awakening the mobile device from a passive operating mode to an active operating mode, and a fourth interface portion 208 that includes standard interface elements.

Referring more particularly to the various interface portions 202-208 of secondary graphical user interface 200, the first interface portion 202 includes a text field 210 for displaying the current time and another text field 212 for displaying the current date and day of the week. Second interface portion 204 includes one or more notification portions, three of which are illustrated in the example of FIG. 2. A first notification portion 214 includes notification information related to navigation directions obtained from a mapping application running on the mobile device. The navigation information included in first notification portion 214 includes a directions indicator 216 that is similar to directions indicator 114 of FIG. 1. First notification portion 214 also includes a text field 218 for displaying the name of the destination location (e.g., Pioneer Park), a text field 220 for displaying the name of the next directional step for the user to follow while traveling to the destination location (e.g., "Left on Church St."), a text field 222 for displaying the estimated distance remaining until a user reaches the destination location (e.g., 0.3 miles) and a text field 224 for displaying the estimated time remaining until a user reaches the destination location (e.g., 6 minutes). A second notification portion 225 provides an example notification from a social network application running in the background on a mobile device. Third notification portion 226 provides an example notification from an email application running in the background on the mobile device. Third interface portion 206 includes a screen portion 228 that includes one or more selectable features with which a user can interact to unlock a mobile device. For example, a selectable lock icon 230 can be selected by a user to transition the current screenshot on the mobile device from a secondary user interface to a primary user interface. In some examples, an intermediate user interface will be provided for a user to enter their password to unlock their mobile device before transitioning to a primary user interface. Fourth interface portion 208 can include a plurality of standard user-selectable interface elements such as back button 232, home button 234 and menu button 236, which are similar in form and function to standard interface elements 120, 122 and 124 described relative to FIG. 1.

Figure 3:
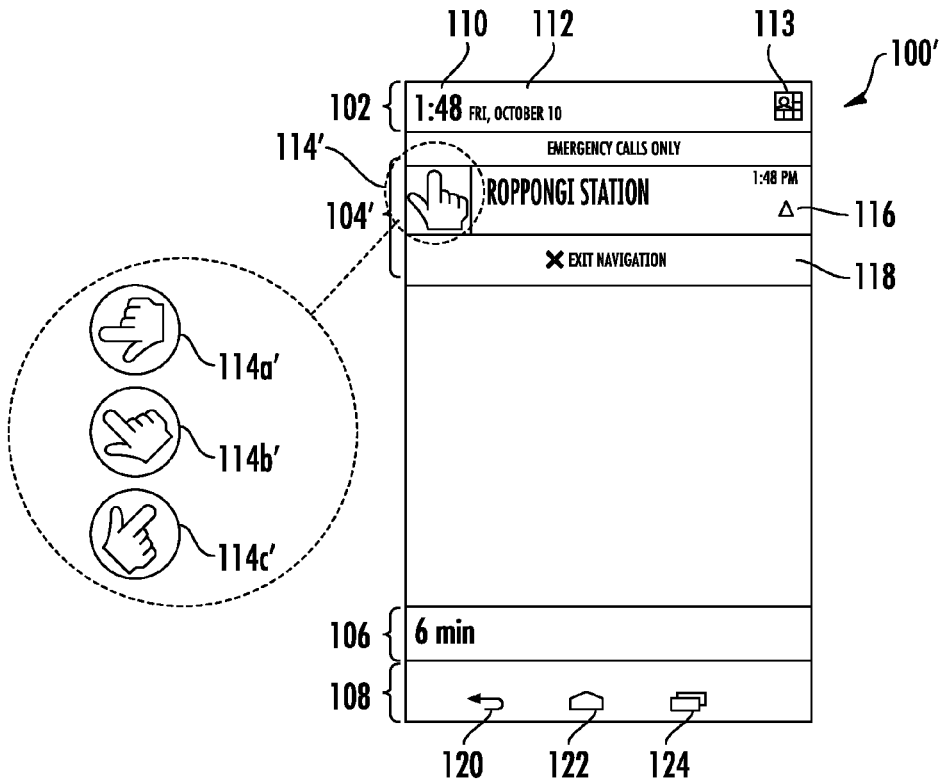
FIG. 3 depicts a third example secondary graphical user interface configured to display selected navigation information on a mobile device according to example aspects of the present disclosure.
Figure 4:
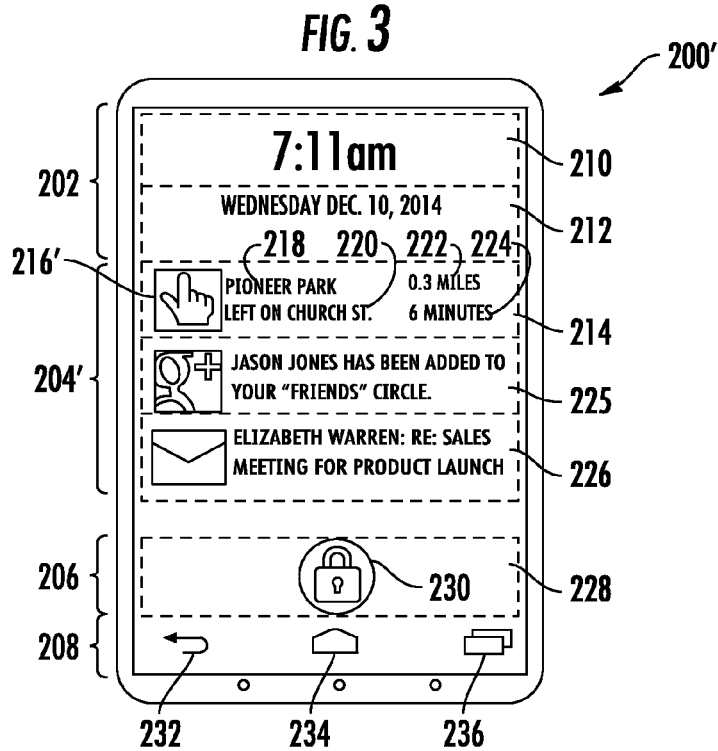
FIG. 4 provides a fourth example secondary graphical user interface configured to display selected navigation information on a mobile device according to example aspects of the present disclosure.

FIGS. 3-4 depict third and fourth examples of secondary graphical user interfaces that can be used to display selected navigation information to a mobile device user. The third example secondary graphical user interface 100' of FIG. 3 is similar in most respects to the first example secondary graphical user interface 100 of FIG. 1, except for including a modified second interface portion 104'. The fourth example secondary graphical user interface 200' of FIG. 4 is similar in most respects to the second example secondary graphical user interface 200 of FIG. 2, except for including a modified second interface portion 204'. The navigation notifications within second interface portions 104' and 204' include a directions indicator 114' and 216' that respectively includes a pointer element (e.g., a hand icon with a pointing finger). The pointing element within directions indicator 114' or 216' can be updated in order to dynamically display a direction in which a user of the mobile device should travel along a given set of navigation directions in order to reach the destination location from a current location and device orientation. The dynamically updated nature of directions indicator 114' of FIG. 3 is represented by different time-varied embodiments 114a', 114b' and 114c' of directions indicator 114'.

Figure 5:
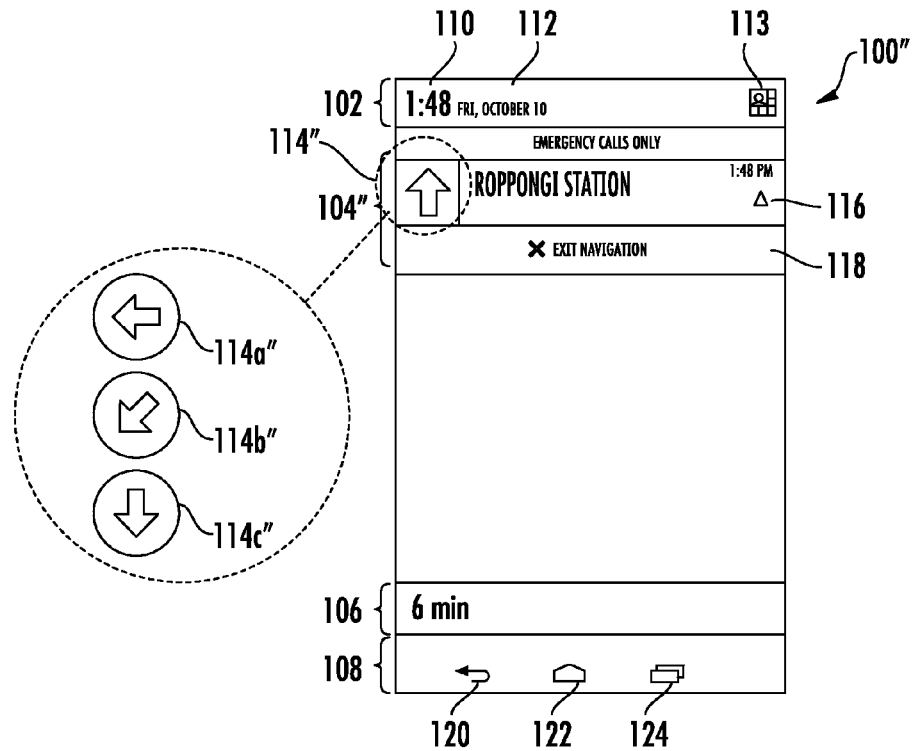
FIG. 5 depicts a fifth example secondary graphical user interface configured to display selected navigation information on a mobile device according to example aspects of the present disclosure.
Figure 6:
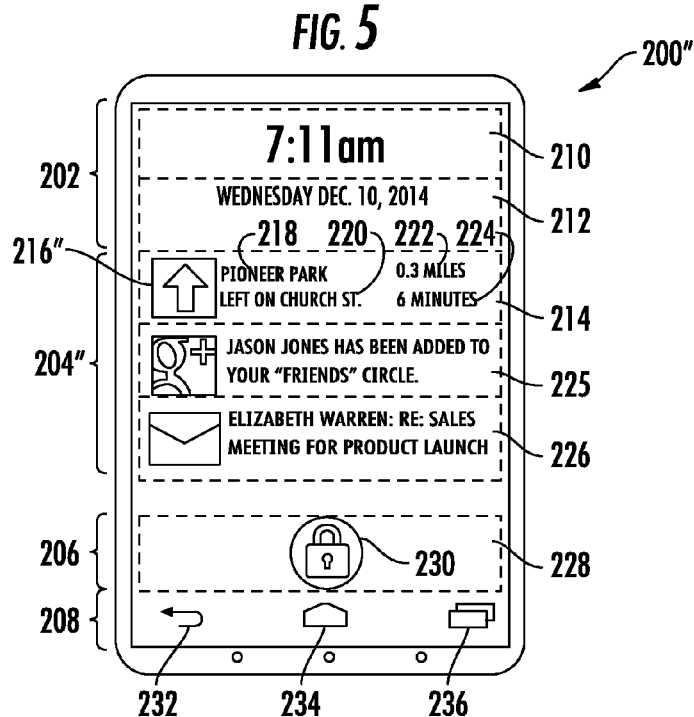
FIG. 6 provides a sixth example secondary graphical user interface configured to display selected navigation information on a mobile device according to example aspects of the present disclosure.

FIGS. 5-6 depict fifth and sixth examples of secondary graphical user interfaces that can be used to display selected navigation information to a mobile device user. The fifth example secondary graphical user interface 100" of FIG. 5 is similar in most respects to the first example secondary graphical user interface 100 of FIG. 1, except for including a modified second interface portion 104". The sixth example secondary graphical user interface 200" of FIG. 6 is similar in most respects to the second example secondary graphical user interface 200 of FIG. 2, except for including a modified second interface portion 204". The navigation notifications within second interface portions 104" and 204" include a directions indicator 114" and 216" that respectively includes a graphical arrow icon (e.g., an arrow consisting of a block line with a directional pointer on one end). The directions indicator 114" or 216" can be updated in order to dynamically display a direction in which a user of the mobile device should travel along a given set of navigation directions in order to reach the destination location from a current location and device orientation. The dynamically updated nature of directions indicator 114" of FIG. 5 is represented by different time-varied embodiments 114a", 114b" and 114c" of directions indicator 114".

FIGS. 7 and 8 depict seventh and eighth examples of secondary graphical user interfaces that can be used to display selected navigation information to a mobile device user. Secondary graphical user interface 250 of FIG. 7 generally includes a first interface portion 251, a second interface portion 252, a third interface portion 253, and a fourth interface portion 254. First interface portion 251 provides display space for text fields or icons that indicate general information about the status of a mobile device, for example, modes of operation and/or status of various signals obtained at the mobile device. Second interface portion 252 provides display space for a text field 255 configured to display the current time and a text field 256 configured to display the current date and day of the week. Third interface portion 253 generally includes navigation notification information generated in accordance with the disclosed techniques to point a user along a set of navigation directions towards a destination location. More particularly, third interface portion 253 includes a directions indicator 257 that is dynamically updated in accordance with the disclosed techniques, a text field 258 configured to display the destination location associated with the given set of navigation directions, and a text field 259 configured to display the current directional step within the navigation directions that a user should be following. The current directional step displayed in text field 259 can include such information as current direction, current street and next street or turn point. Fourth interface portion 254 can include a set of standard interface elements, such as phone interface element 260 that can be selected to activate a phone function available on a mobile device, a lock interface element 261 that can be selected to launch an interactive interface by which a user may unlock his mobile device from a passive to an active operating mode, and a camera interface element 262 that can be selected to activate a camera function available on the mobile device.

Referring now to FIG. 8, secondary graphical user interface 280 generally includes a first interface portion 281, a second interface portion 282, and a third interface portion 283. First interface portion 281 is similar to first interface portion 251 of FIG. 7 and provides display space for text fields or icons that indicate general information about the status of a mobile device. Second interface portion 282 provides an expanded amount of navigation notification information relative to the navigation notification information provided in second interface portion 253 of FIG. 7. In some examples, a mobile device could be configured to display a compact version of navigation notification information, such as shown in FIG. 7, when the mobile device initially transitions to a passive operating mode. If a user desires more detailed navigation notification information than that displayed in the interface 250 of FIG. 7, a user may select the second interface portion 253 (or other designated button or portion of user interface 250) which can trigger the display of user interface 280 of FIG. 8 or some other expanded secondary graphical user interface that provides more comprehensive navigation notification information than the initially displayed interface without having to transition to an active operating mode by entering credential, password, gesture, or other information to transition to the active operating mode.

In the example of FIG. 8, second interface portion 282 includes a directions indicator 284 that is dynamically updated in accordance with the disclosed techniques, a text field 285 configured to display the destination location associated with the given set of navigation directions, a text field 286 configured to display the current directional step within the navigation directions that a user should be following, a text field 287 configured to display the estimated distance left until the user arrives at a destination location, a text field 288 configured to display the estimated arrival time (or time until arrival) until the user reaches a destination location and a selectable interface portion 289 by which a user can initiate exit of the current navigation directions. Third interface portion 283 can include a set of standard interface elements, such as phone interface element 290 that can be selected to activate a phone function available on a mobile device, a lock interface element 291 that can be selected to launch an interactive interface by which a user may unlock his mobile device from a passive to an active operating mode, and a camera interface element 292 that can be selected to activate a camera function available on the mobile device.

FIGS. 9-10 depict examples of primary graphical user interfaces that can be used by a mobile device user to interact with an example mapping application in accordance with aspects of the disclosed technology. Again, these primary graphical user interfaces generally are provided for display on a mobile device while the device is engaged in an active operating mode. Primary graphical user interface 300 of FIG. 9 generally corresponds to a home screen for a mobile device and includes a plurality of selectable icon buttons 302 that initiate the launch of various applications saved on or accessible by the mobile device. In particular, a "Maps" icon 304 is displayed on primary graphical user interface 300 to launch a mapping application, geographic information system, navigation application or other application that can be used to determine and/or access navigation directions. By selecting the Maps icon 304, a user may launch the mapping application and further interact to obtain such directions (e.g., by requesting navigation directions from a start location to a destination location.)

FIG. 10 shows an example of a primary graphical user interface 400 that might be displayed while a mobile device user is actively interfacing with a mapping application. Primary graphical user interface 400 can be configured to provide a comprehensive collection of navigation information for display on a mobile device, wherein the navigation information generally describes various aspects of navigation directions to one or more particular destination locations. For example, primary graphical user interface 400 includes a first interface portion 402, a second interface portion 404, and a third interface portion 406.

First interface portion 402 includes a text field 408 for displaying the location entity or semantic place label for the destination location (e.g., Lincoln Center), a text field 410 for displaying the physical address of the destination location (e.g., 70 Lincoln Center Plaza, New York, N.Y. 10023), a text field 412 for displaying an estimated time remaining (e.g., 9 minutes) until the mobile device user reaches the destination location, a text field 414 for displaying an estimated distance remaining (e.g., 1.4 miles) until the mobile device user reaches the destination location, and a text field 416 for providing information that characterizes a selected route to the destination location.

Second interface portion 404 includes a map or geographic display 418 of an area pertaining to the pertinent navigation directions, including basic map components such as roads, landmarks, bodies of water, public transportation routes and stops, etc. Specific information pertaining to the pertinent navigation directions can then be overlayed onto geographic display 418, such as start location 420, destination location 422, selected route 424, and current location 426.

Third interface portion 406 includes additional information related to the pertinent navigation directions, such as a selectable icon 430 by which a user can access a directions list of directional steps for the user to follow while traveling to the destination location. Selectable icons 432 and 434 can be used to select a previous directional step or a next directional step in the directions list. Icon 436 corresponds to a directional indicator for pointing a user in the correct direction towards the destination location.

Figure 11:
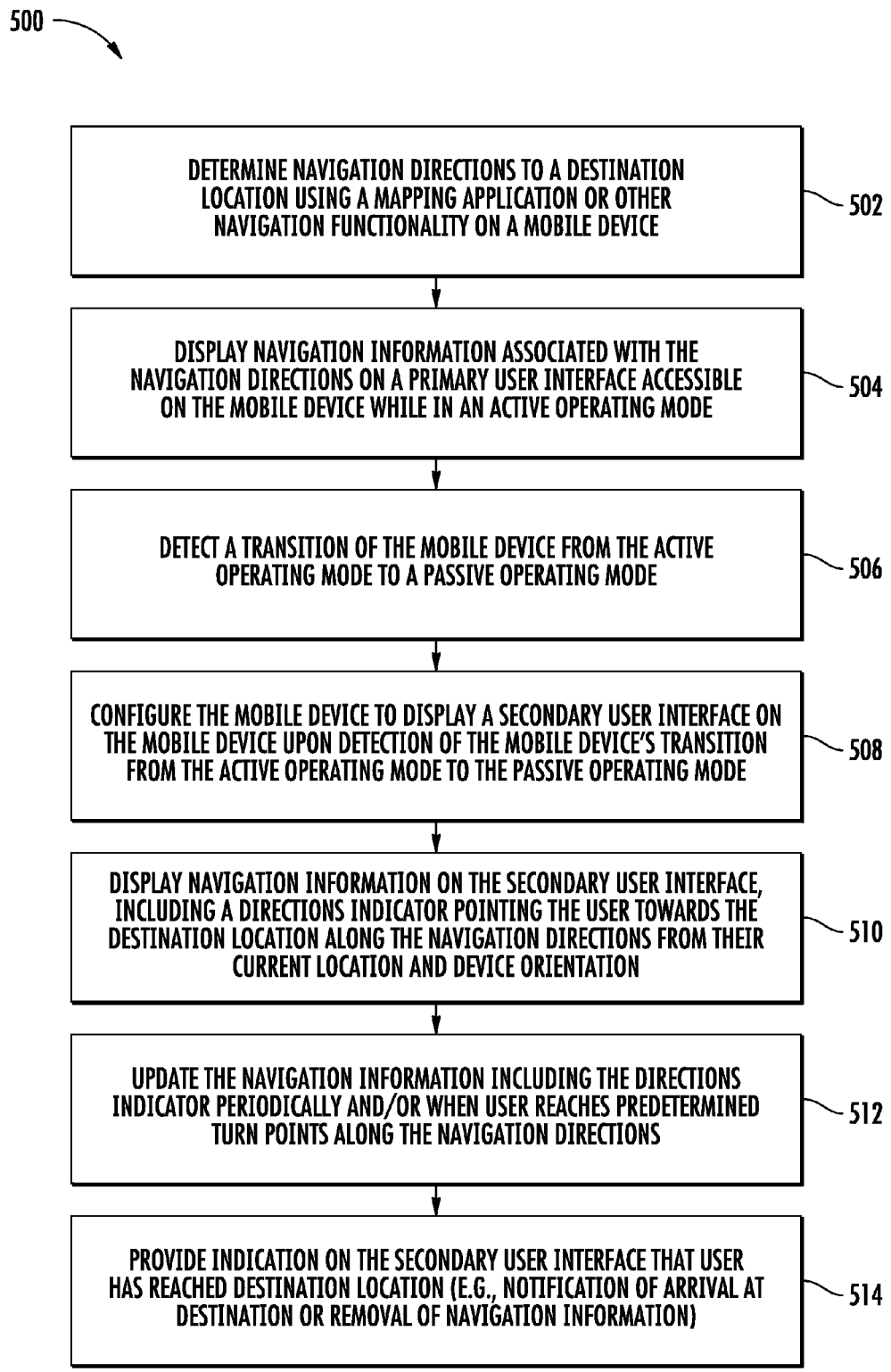
FIG. 11 provides a flow diagram of an example method of displaying navigation information on a mobile device according to example aspects of the present disclosure.

Referring now to various computer-implemented methods of the disclosed technology, FIG. 11 provides a flow diagram of an example method of displaying navigation information on a mobile device. The method (500) of displaying navigation information on a mobile device includes determining (502) navigation directions to a destination location. In some examples, the navigation directions are determined at (502) using a mapping application operating on the mobile device, although other examples could involve having a route determined by other navigation functionality such as but not limited to a mapping portion of a browser or by a remote service that provides the requested routes and related information to the mobile device upon request. In some examples, the navigation directions are determined or accessed at (502) in response to a request for navigation directions to the destination location (e.g., a user request provided as input to the mapping application, browser, or remote service). In other examples, the navigation directions are determined or accessed automatically at (502) upon predicting a destination location and/or route based on a user's current location and/or route compared with historical route and location data. Such automated destination detection capabilities can serve to predict where a user is going without the user explicitly telling the mobile device. A more particular example of automated destination detection features is depicted in FIG. 12.

Figure 12:
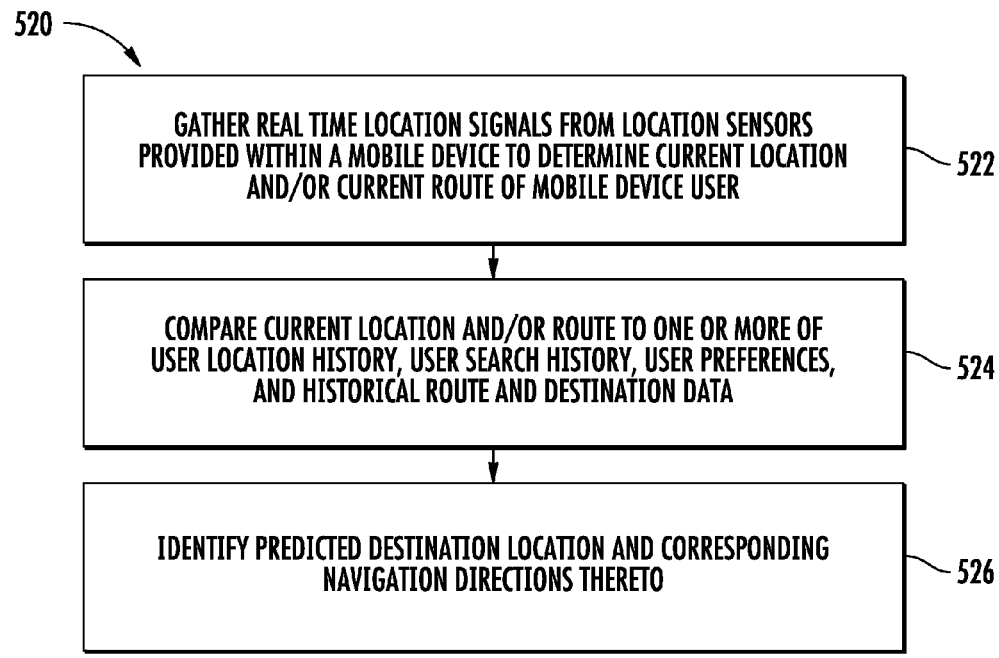
FIG. 12 provides a flow diagram of an example method of automatically predicting a destination location for obtaining navigation directions according to example aspects of the present disclosure.

Referring now to FIG. 12, method (520) of automatically predicting a destination location and associated navigation directions includes gathering (522) real time location signals from location sensors provided within a mobile device. The gathered location signals can be used to determine current geographical location and/or a current route being followed or navigated by the mobile device. This current location and/or route information can then be compared at (524) to one or more historic location variables, such as but not limited to user location history, user search history, user preferences for navigation, destination locations or the like, as well as historical route and destination data. From the comparisons at (524), a predicted destination location can be identified at (526). Determining navigation directions to the predicted destination location can also be a part of the identification at (526) or part of determining navigation directions at (502) in method (500) of FIG. 11.

Referring again to FIG. 11, navigation information associated with the navigation directions determined at (502) optionally can be displayed (504) on a primary user interface accessible on the mobile device while the mobile device is operating in a first operating mode (e.g., an active operating mode). The navigation information displayed at (504) can include one or more components of navigation data including but not limited to start location, destination location, one or more suggested route options between the start and destination locations, a current location indicator along the one or more routes, estimated distance and/or time remaining on a route, a directional indicator pointing a user in the proper direction for traveling towards the destination location, a detailed list of directional steps for the user to follow while traveling to the destination location, a location entity (e.g., a semantic place label) associated with the user's current location, start location and/or destination location, and geographical maps that display aspects of the aforementioned components. An example of navigation information displayed at (504) is depicted in the primary graphical user interface 400 of FIG. 10.

Referring still further to FIG. 11, a transition of the mobile device from the first operating mode to a second operating mode (e.g., a passive operating mode) is detected at (506). In some embodiments, a mobile device transitions from the active operating mode to the passive operating mode after no user interaction has been detected at the mobile device for a predetermined amount of time. Upon detection (506) of the transition from the first operating mode to the second operating mode, the mobile device can be configured to display (508) a secondary user interface. A subset of the navigation information associated with the navigation directions determined at (502) can be displayed at (510) on the secondary user interface. In some examples, the subset of navigation information displayed at (510) on the secondary user interface includes a directions indicator that dynamically displays a direction in which a user of the mobile device should travel in order to reach the destination location from a current location and device orientation. More particularly, the directions indicator dynamically displays a direction in which a user of the mobile device should travel along a route established by the navigation directions in order to reach the destination location from the user's current location and device orientation. Examples of displaying (510) a subset of navigation information are depicted in the secondary graphical user interfaces of FIGS. 1-8, respectively.

Referring still to FIG. 11, aspects of the navigation information displayed on the secondary user interface at (510), including the directions indicator, can be updated at (512) in one or more manners. In some examples, the directions indicator and additional navigation information are updated continuously in real time. In other examples, the directions indicator and additional navigation information are updated in a periodic manner (e.g., once per second or fraction of a second, minute or other portion of time) based on updated determinations of the user's current location, mobile device orientation and/or recent direction or route information. In other examples, the directions indicator and additional navigation information are updated when the mobile device senses a significant change in the user's mobile device orientation (e.g., the user turns around or rotates his mobile device greater than some predetermined threshold percentage of a 360-degree directional field). In still further examples, the directions indicator and additional navigation information are updated when the mobile device reaches one or more turn points within navigation directions to the user's destination location, such that a user receives an updated directions indicator each time he reaches the next directional step in a set of navigation directions. In still further examples, the directions indicator and additional navigation information are updated when the mobile device enters or exits one or more geofences established in relation to the navigation directions, destination location or other location information. Whenever one or more of these update opportunities are triggered, updates to the navigation information generated at (512) indicate a revised direction towards which the user should continue on his current route in order to reach the next turn point or the ultimate destination location. As such, even while the mobile device is in a passive operating mode, current location and device orientation information is updated so that corresponding updates to directions indicators and other navigation information can be provided to a mobile device user.

In some example embodiments, the frequency and manner in which updates are implemented at (512) can be customized to improve battery power savings. For example, the mobile device can be configured to operate only the limited functionality needed to provide the disclosed navigation notifications while limiting other services running in the background. This can be facilitated in part by operating the mobile device in a passive mode as opposed to an active mode. A mobile device system can be configured to avoid or minimize redundant operations. For example, if sensor polling is implemented for the disclosed navigation notification purposes and also for other applications running on the mobile device, then polling of the location and/or orientation sensors can be coordinated across device applications to streamline the total amount of occurrence and reduce power consumption. The total number of location and/or sensor updates generally can be reduced to lower power consumption. Location and/or orientation updates can be callback-based (e.g., done only on a periodic basis or upon occurrence of certain predetermined events) as opposed to continuously updating as might be the case when a mapping application is running in an active operating mode. A mobile device can be configured to estimate location based on information available from only a subset of available location sensors. For instance, even though a mobile device may typically include multiple location sensors (e.g., location sensors based on GPS, Wi-Fi, and Cellular Signals), current location can be estimated only when receiving cell tower signal updates even when a GPS sensor is off and/or Wi-Fi signals are unavailable.

In still further examples, geofencing mechanisms can be employed to help achieve power consumption advantages while running in a passive operating mode. In general, geofencing allows a mobile device to create various areas surrounding one or more locations of interest and detect when a mobile device exits and/or enters those geofenced areas. It is possible to establish multiple active geofences at one time, each respectively defined by a latitude and longitude of a location of interest and a radius defining the area around the location of interest. In accordance with the disclosed technology, one or more geofences can be created that correspond to locations such as a mobile device's current location, start location, destination location, and turn points or other locations along navigation directions to a destination location. By creating these geofences, location services provided on a mobile device can save power by retrieving location information relative to only a subset of a geographic data contained within these geofenced areas, as opposed to more comprehensive geographic data associated with a surrounding area. In addition, location and/or orientation sensor polling and/or updates occurring at (512) can be coordinated to occur upon detection that a mobile device has entered or exited various geofenced areas along a given set of navigation directions.

Referring again to FIG. 11, when a mobile device user finally reaches a destination location, indications of this occurrence optionally can be provided on the secondary user interface at (514). For example, a notification within the navigation information displayed on a secondary user interface can provide an arrival notification indicating for example, "You have arrived" or "Destination Location Reached." In another example, arrival at the destination location will result in removal of navigation information from the secondary user interface, such that navigation information is no longer provided for display on the secondary user interface when a determination is made that the mobile device has reached the destination location. Identification of a mobile device user having arrived at the destination location can occur, for example, when the current location of the mobile device is determined to match the destination location for a given set of navigation directions or when a mobile device is determined to have entered a geofence defined with the destination location as its location of interest.

Figure 13:
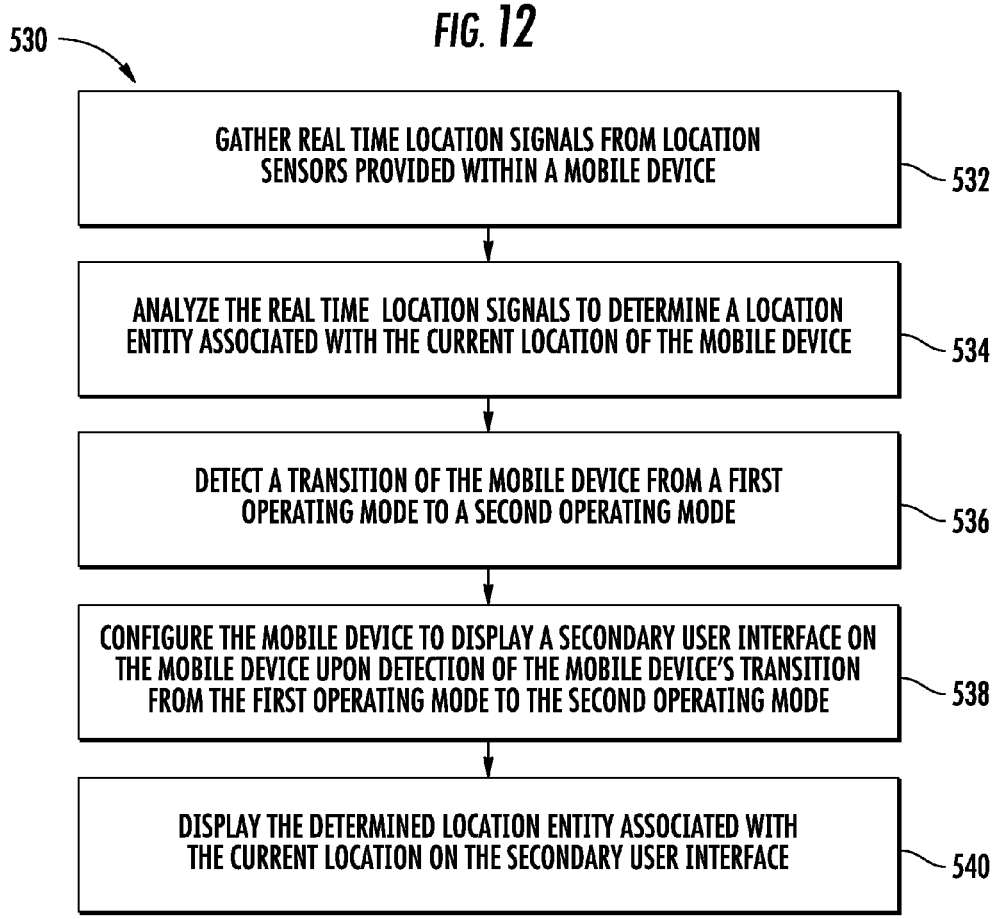
FIG. 13 provides a flow diagram of an example method of displaying current location information on a mobile device according to example aspects of the present disclosure.

FIG. 13 provides a flow diagram of an example method (530) of displaying current location information on a mobile device according to example aspects of the present disclosure. Method (530) uses a similar mapping application or other geographic information system provided on a mobile device to provide current location information on a secondary user interface such as a lock screen or passive notifications center. This current location information can be provided separately from the previously described navigation information or as an optional part of the navigation information disclosed on a secondary user interface in method (500). The method (530) involves gathering (532) real time location signals from location sensors provided within a mobile device. Location sensors can include, but are not limited to, global positioning system (GPS) outputs, wireless scan outputs, and accelerometer outputs, or other components that can be employed to obtain a best known estimate of a user's physical location (e.g., specific geographical coordinates.)

Once location signals associated with a user's current location are gathered at (532), such signals optionally are analyzed at (534) to determine additional information associated with the current location. In some examples, the geographical coordinates for a user's current location can be compared to a database of known places (e.g., local businesses) to infer the most likely semantic place label for the current location of the user (e.g., the name of the venue, home or business). A semantic place label is an identifier (e.g., the common "name") for any feature, landmark, point of interest, or other object or event associated with a geographic location. For instance, a semantic place label can correspond to an identifier for a business, restaurant, church, residence, retail outlet, coffee shop, bar, music venue, attraction, museum, theme park, arena, stadium, festival, organization, entity, region, neighborhood, or other suitable points of interest. A semantic place label typically is distinguishable from a coordinate-based or location-based identifier. However, in addition to a name, additional information associated with a semantic place such as longitude, latitude, and altitude coordinates and/or a street address associated with the semantic place can be provided.

Sources for identifying a semantic place label can include, for example, a database of entity information that links location entities to geographic locations (e.g. a geographic information system database). Factors for designating the most appropriate semantic place label from a plurality of possible choices can include one or more of: a distance feature representing a distance between the semantic place and current geographic location; a popularity feature describing a popularity of the semantic place (e.g., a number of social media mentions, a number of check-ins, a number of requests for directions, and/or a global popularity rank); a business hour overlap feature describing whether a set of business hours associated with the semantic place overlap with a time segment for the current geographic location; and one or more personalization features describing previous interaction between the mobile device user and the semantic place. Example personalization features can include: a number of instances in which the user performed a map click with respect to the semantic place; a number of instances in which the user requested directions to the semantic place; a number of instances in which the user has checked-in to the semantic place; a number of instances in which the user has transacted with the semantic place as evidenced by data obtained from a mobile payment system or virtual wallet; and/or a number of instances in which the user has performed a web search query with respect to the semantic place.

Referring still to FIG. 13, a mobile device transition is detected at (536), representing a shift within the mobile device from a first operating mode (e.g., an active one) to a second operating mode (e.g., a passive one). Upon such detection at (536), the mobile device can be configured at (538) to display a secondary user interface on the mobile device. Current location information, including a specific geographic location as well as an optional semantic place label determined at (534) and any other additional location information identifying the mobile device user's current location then can be displayed at (540) on the secondary user interface of the mobile device. This current location information can be continuously updated in real time, updated only when a user changes his current location, and/or periodically at discrete intervals (e.g., once per second or fraction of a second, minute or other portion of time).

Figure 14:
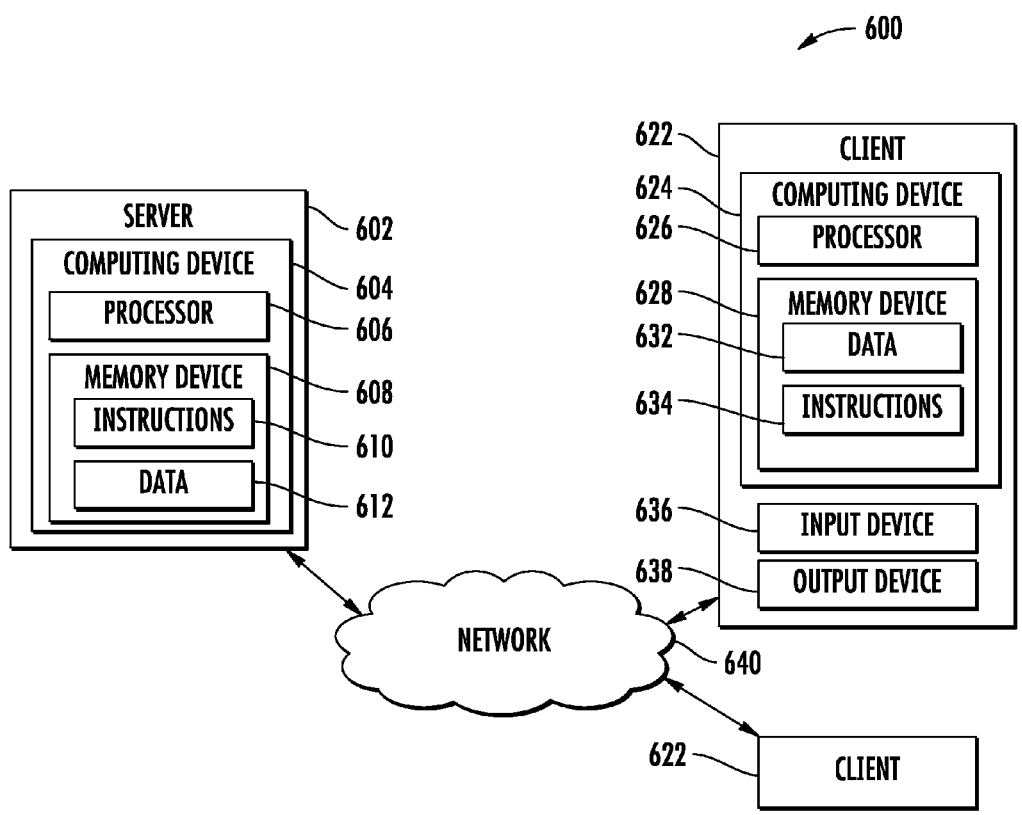
FIG. 14 provides an example overview of system components for implementing a passive location notification application according to example aspects of the present disclosure.
Figure 15:
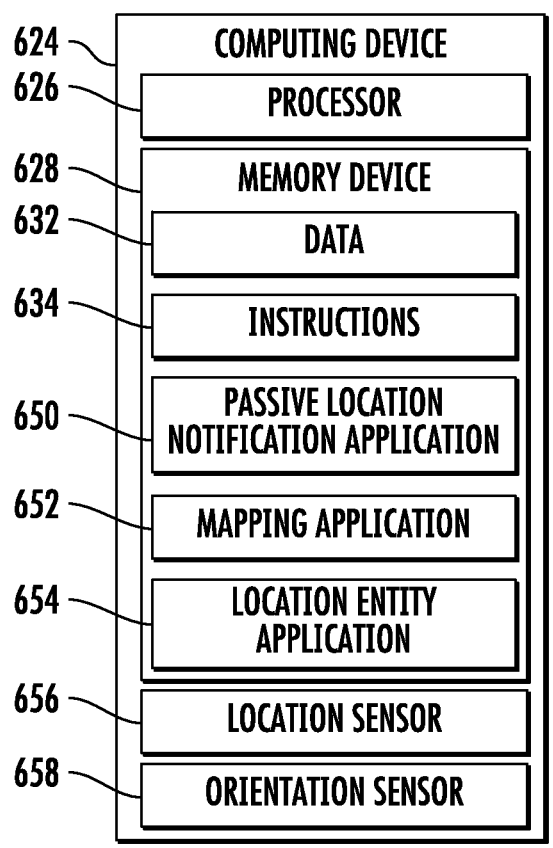
FIG. 15 provides an example overview of software-based modules for including within a passive location notification application according to example aspects of the present disclosure.

FIGS. 14 and 15 provide example overviews of system and software components for implementing various embodiments of the computer-implemented methods of FIGS. 11-13 as well as the graphical user interfaces of FIGS. 1-10. FIG. 14 depicts a computing system 600 that can be implemented using a client-server architecture that includes a server 602 and one or more clients 622. Server 602 may correspond, for example, to a web server hosting a geographic information system accessible by clients 622 in order to assist with determining navigation directions or navigation related information, semantic place label information or other information determined in accordance with the disclosed techniques.

Each server 602 and client 622 can include at least one computing device, such as depicted by server computing device 604 and client computing device 624. Although only one server computing device 604 and one client computing device 624 is illustrated in FIG. 14, multiple computing devices optionally may be provided at one or more locations for operation in sequence or parallel configurations to implement the disclosed methods and systems of displaying navigation information. In other examples, the system 600 can be implemented using other suitable architectures, such as a single computing device. Each of the computing devices 604, 624 in system 600 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device. Computing device 624 can correspond to a mobile device including one or more processors configured to perform aspects of the disclosed technology.

The computing devices 604 and/or 624 can respectively include one or more processor(s) 606, 626 and one or more memory devices 608, 628. The one or more processor(s) 606, 626 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 608, 628 can include one or more computer-readable media, including, but not limited to, non-transitory computer-readable media, RAM, ROM, hard drives, flash memory, or other memory devices. In some examples, memory devices 608, 628 can correspond to coordinated databases that are split over multiple locations.

The one or more memory devices 608, 628 store information accessible by the one or more processors 606, 626, including instructions that can be executed by the one or more processors 606, 626. For instance, server memory device 608 can store databases for storing semantic place identifier information, navigation and mapping databases and other comprehensive databases. The client memory device 628 can store instructions for implementing a browser or module that allows a user to request information from server 602, including navigation directions, navigation information, location information, and/or information related to past, current or future client locations. Client memory device 628 can also store instructions for implementing a passive location notification application that displays various navigation information and/or current location information in accordance with the disclosed technology. The one or more memory devices 608, 628 can also include data 612, 632 that can be retrieved, manipulated, created, or stored by the one or more processors 606, 626.

Computing devices 604 and 624 can communicate with one another over a network 640. In such instances, the server 602 and one or more clients 622 can also respectively include a network interface used to communicate with one another over network 640. The network interface(s) can include any suitable components for interfacing with one more networks, including for example, transmitters, receivers, ports, controllers, antennas, or other suitable components. The network 640 can be any type of communications network, such as a local area network (e.g. intranet), wide area network (e.g. Internet), cellular network, or some combination thereof. The network 640 can also include a direct connection between server computing device 604 and client computing device 624. In general, communication between the server computing device 604 and client computing device 624 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The client 622 can include various input/output devices for providing and receiving information to/from a user. For instance, an input device 636 can include devices such as a touch screen, touch pad, data entry keys, and/or a microphone suitable for voice recognition. Input device 636 can be employed by a user to identify a destination location for determining navigation directions thereto in accordance with the disclosed embodiments. An output device 638 can include audio or visual outputs such as speakers or displays for providing graphical user interfaces including navigation information and current location to a user. Audio and/or visual alarms also could be provided at output device 638 to provide signals to a user indicating the arrival of a user at a destination location or specific directional steps along a route to a destination location.

FIG. 15 shows a more detailed view of a computing device 624 such as shown in FIG. 14, which is particularly configured as a mobile device implementing a passive location notification application 650 in accordance with the disclosed technology. Passive location notification application 650 could include a set of instructions stored within the computer-readable media that constitutes memory device 628. Passive location notification application 650 includes instructions for executing the computer-implemented methods set forth in FIGS. 11-13. In particular, passive location notification application 650 is configured to provide for display the various graphical user interfaces, including secondary graphical user interfaces displayed during operation of mobile computing device 624 while in a passive operating mode. Additional applications may be stored within memory device 628, including a mapping application 652 configured to help determine or access the navigation instructions to a particular destination application and a location entity application 654 configured to help determine a semantic place identifier for the user's current location. One or more location sensors 656 can be provided to help identify a user's current geographical location and one or more orientation sensors 658 can be provided to help identify a mobile device's current orientation direction in order to provide desired navigation information in accordance with the disclosed technology. Other location, position, and/or orientation sensors including beacons, accelerometers, gyroscopes, ambient light sensors, proximity sensors, and others also may be provided as part of a mobile device, although not illustrated in FIG. 15.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the module.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of displaying navigation information on a mobile device, comprising:

determining, by one or more processors, navigation directions to a destination location;

detecting, by the one or more processors, a transition of the mobile device from an active operating mode to a passive operating mode;

configuring, by the one or more processors, the mobile device to display a secondary user interface on the mobile device upon detection of the transition of the mobile device from the active operating mode to the passive operating mode;

providing for display, by the one or more processors, navigation information associated with the navigation directions on the secondary user interface, wherein the navigation information comprises a directions indicator that dynamically displays a direction within a 360-degree range of orientations in which a user of the mobile device should travel along the navigation directions relative to the current location and device orientation of the mobile device in order to reach the destination location; and providing for display, by the one or more processors, a semantic place label on the secondary user interface that corresponds with the current location of the mobile device, wherein the semantic place label comprises an identifier for the common name of a location entity associated with the current location of a user, wherein the identifier is distinguishable from a coordinate-based or location-based identifier.

2. The computer-implemented method of claim 1, wherein the secondary user interface comprises a lock screen for the mobile device that requires a user to enter a password or credential in order to transition from the passive operating mode to the active operating mode.

3. The computer-implemented method of claim 1, wherein the secondary user interface comprises a passive notifications screen for the mobile device.

4. The computer-implemented method of claim 1, wherein the directions indicator comprises one or more of a graphical arrow, a line with an end element, a pointer and a tapered polygon.

5. The computer-implemented method of claim 1, further comprising periodically updating the navigation information including the directions indicator provided for display on the secondary user interface.

6. The computer-implemented method of claim 1, further comprising providing for display, by the one or more processors, navigation information associated with the navigation directions via a primary user interface accessible on the mobile device while the mobile device is operated in the active operating mode.

7. The computer-implemented method of claim 1, wherein the navigation information displayed on the secondary user interface comprises a next upcoming directional step within the navigation directions to the destination location.

8. The computer-implemented method of claim 1, further comprising receiving, by the one or more processors, a request for navigation directions to the destination location via a mapping application on the mobile device.

9. The computer-implemented method of claim 1, wherein the navigation directions to the destination location are determined automatically by the one or more processors upon identifying a predicted destination location.

10. The computer-implemented method of claim 9, wherein identifying a predicted destination location is based at least in part on a comparison of current location of the mobile device to one or more of location history, route history and search history.

11. The computer-implemented method of claim 1, further comprising providing an indication on the secondary user interface that the mobile device has reached the destination location upon determining that the current location of the mobile device matches the destination location.

12. The computer-implemented method of claim 1, wherein the passive operating mode uses less operating power of the mobile device than the active operating mode.

13. The computer-implemented method of claim 1, wherein the mobile device transitions from the active operating mode to the passive operating mode after no user interaction has been detected at the mobile device for a predetermined amount of time.

14. A mobile computing device, comprising:
one or more processors; and
one or more memory devices, the one or more memory devices storing computer-readable instructions that when executed by the one or more processors, cause the one or more processors to perform operations, the operations comprising:
accessing navigation directions to a destination location;
detecting a transition of the mobile computing device from an active operating mode to a passive operating mode;
configuring the mobile computing device to display a secondary user interface on the mobile computing device upon detection of the transition of the mobile computing device from the active operating mode to the passive operating mode, wherein the passive operating mode uses less operating power of the mobile computing device than the active operating mode; and
providing for display navigation information associated with the navigation directions on the secondary user interface, wherein the navigation information comprises a directions indicator that dynamically displays a direction within a 360-degree range of orientations in which a user of the mobile computing device should travel along the navigation directions relative to the current location and device orientation of the mobile device in order to reach the destination location; and
providing for display a semantic place label on the secondary user interface that corresponds with the current location of the mobile device, wherein the semantic place label comprises an identifier for the common name of a location entity associated with the current location of a user, wherein the identifier is distinguishable from a coordinate-based or location-based identifier.

15. The computing system of claim 14, wherein the operations further comprise periodically updating the directions indicator provided for display on the secondary user interface.

16. The computing system of claim 14, wherein the navigation information displayed on the secondary user interface comprises a next upcoming directional step within the navigation directions to the destination location.

17. The computing system of claim 14, wherein the semantic place label is chosen from a plurality of possible choices by considering one or more factors including: a distance feature representing a distance between the semantic place and current geographic location; a popularity feature describing a popularity of the semantic place; a business hour overlap feature describing whether a set of business hours associated with the semantic place overlap with a time segment for the current geographic location; or one or more personalization features describing previous interaction between the mobile device user and the semantic place.

18. One or more tangible, non-transitory computer-readable media storing computer-readable instructions that when executed by one or more processors cause the one or more processors to perform operations, the operations comprising:
gathering information from one or more sensors to determine a current location and device orientation of a mobile device;
transitioning within the mobile device from an active operating mode to a passive operating mode, wherein the passive operating mode consumes less power of the mobile device than the active operating mode; and
providing a secondary graphical user interface for display during the passive operating mode, wherein the secondary graphical user interface provides location notification information including: a semantic place label associated with the mobile device's current location and a directions indicator that dynamically displays a direction within a 360-degree range of orientations in which a user of the mobile device should travel along a given route relative to the current location and device orientation of the mobile device in order to reach a destination location;
wherein the semantic place label comprises an identifier for the common name of a location entity associated with the current location of a user, wherein the identifier is distinguishable from a coordinate-based or location-based identifier.

19. The one or more tangible, non-transitory computer-readable media of claim 18, wherein the operations comprise updating the directions indicator when a user reaches predetermined turn points along the given route.

20. The one or more tangible, non-transitory computer-readable media of claim 18, wherein transitioning within the mobile device from the active operating mode to the passive operating mode occurs after no user interaction has been detected at the mobile device for a predetermined amount of time.

* * * * *